United States Patent
Nishii

(10) Patent No.: US 9,890,265 B2
(45) Date of Patent: Feb. 13, 2018

(54) MODIFIED POLYVINYL ALCOHOL RESIN COMPOSITION, FILM, AND TIRE

(71) Applicant: BRIDGESTONE CORPORATION, Tokyo (JP)

(72) Inventor: Masayuki Nishii, Tachikawa (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/319,399

(22) PCT Filed: May 1, 2015

(86) PCT No.: PCT/JP2015/002316
§ 371 (c)(1),
(2) Date: Dec. 16, 2016

(87) PCT Pub. No.: WO2015/194086
PCT Pub. Date: Dec. 23, 2015

(65) Prior Publication Data
US 2017/0137600 A1    May 18, 2017

(30) Foreign Application Priority Data
Jun. 17, 2014    (JP) ................................ 2014-124724

(51) Int. Cl.
*C08K 3/36* (2006.01)
*B60C 1/00* (2006.01)
*C09D 129/04* (2006.01)

(52) U.S. Cl.
CPC .............. *C08K 3/36* (2013.01); *B60C 1/0025* (2013.01); *C09D 129/04* (2013.01)

(58) Field of Classification Search
CPC ........ C08K 3/36; B60C 1/0025; C09D 129/04
USPC ....................................................... 524/557
See application file for complete search history.

(56) References Cited

U.S. PATENT DOCUMENTS

| | | | |
|---|---|---|---|
| 6,200,720 | B1 | 3/2001 | Tagami |
| 6,303,199 | B1 | 10/2001 | Takada et al. |
| 2008/0103041 | A1 | 5/2008 | Iida et al. |
| 2013/0329289 | A1* | 12/2013 | Haida ................. G02B 5/3083 359/483.01 |

FOREIGN PATENT DOCUMENTS

| | | |
|---|---|---|
| JP | 48-006195 B | 2/1973 |
| JP | 59-179685 A | 10/1984 |
| JP | 10-152524 A | 6/1998 |
| JP | 10-237226 A | 9/1998 |
| JP | 2001129915 A | 5/2001 |
| JP | 2002-052904 A | 2/2002 |
| JP | 2005-280094 A | 10/2005 |
| JP | 2005313504 A | 11/2005 |
| JP | 2007-063383 A | 3/2007 |
| JP | 2012-250576 A | 12/2012 |
| JP | 2013-071968 A | 4/2013 |

OTHER PUBLICATIONS

Database WPI Week "2017 Clarivate Analytics" XP-02768755, Nov. 10, 2005, (3 pages total).
International Search Report of PCT/JP2015/002316 dated Jun. 23, 2015.

* cited by examiner

*Primary Examiner* — Angela C Scott
(74) *Attorney, Agent, or Firm* — Sughrue Mion, PLLC

(57) ABSTRACT

The purpose of the disclosure is to provide a modified polyvinyl alcohol resin composition having high gas barrier properties as well as excellent flexibility, adhesiveness and fatigue resistance. The modified polyvinyl alcohol resin composition includes: a modified polyvinyl alcohol resin obtainable by introducing a linear chain, alicyclic, branched or aromatic functional group having 3 to 20 carbon atoms, as a graft chain, into a polyvinyl alcohol as a main chain; and silica.

10 Claims, No Drawings

MODIFIED POLYVINYL ALCOHOL RESIN COMPOSITION, FILM, AND TIRE

CROSS REFERENCE TO RELATED APPLICATIONS

This application is a National Stage of International Application No. PCT/JP2015/002316 filed May 1, 2015, claiming priority based on Japanese Patent Application No. 2014-124724 filed Jun. 17, 2014, the contents of all of which are incorporated herein by reference in their entirety.

TECHNICAL FIELD

This disclosure relates to a modified polyvinyl alcohol resin composition, a coating, and a tire.

BACKGROUND

Barrier materials having a hydrogen bond, such as polyamide resins, cellulose-based resins, polyvinyl alcohol, and ethylene polyvinyl alcohol, can demonstrate excellent weather resistance and gas barrier properties, which reflect the strength of intermolecular interactions between main chains.

However, in consideration of the use for various industrial products, such barrier resins do not have sufficient flexibility, fatigue resistance, and adhesion to other materials. Such barrier resins have problems in resistance to fatigue and adhesion to rubber, when used, for example, in applications where they are subjected to numerous deformations in a repeated manner on a rubber substrate, typified by tires, and, therefore, attempts have been made to improve these characteristics.

As a technique for improving the flexibility of barrier materials, for example, PTL 1 discloses alternately laminating a layer composed of a barrier material and a flexible elastomer layer to form a multi-layer structure so that gas barrier properties and flexibility are simultaneously achieved.

As a technique for improving the adhesiveness of barrier materials, for example, PTL 2 discloses that a resin composition containing an ethylene vinyl alcohol copolymer, a thermoplastic polyester resin, a thermoplastic resin having a carbon-carbon double bond, and a transition metal salt has improved gas barrier properties and interlayer adhesiveness.

CITATION LIST

Patent Literature

PTL 1: JP2012250576A
PTL 2: JP201371968A

SUMMARY

Technical Problem

However, the technique of PTL 1 has the following problem: the interface strength between the layer composed of a barrier material and the elastomer layer is insufficient due to the absence of chemical bonding between them, and strength and adhesiveness are lowered by repetitive flexing (fatigue resistance is inferior). It is desired to address such a problem. In addition, each layer is in a film form and their molding processability is limited. Therefore, in consideration of an application to a coating material for a tire sidewall, a further improvement is desired in order to conform to the surface irregularities of a vulcanized tire.

The technique of PTL 2 has a problem in fatigue resistance because the interface strength between phase-separated domains in the composition is insufficient, and a further improvement in flexibility is also desired in consideration of an application to a coating material for a tire sidewall.

In view of the above problems, an object of the disclosure is to provide a graft copolymer having excellent flexibility, adhesiveness, and fatigue resistance while having high gas barrier properties, and, moreover, to provide a resin composition, a coating, a laminate, and a tire having excellent gas barrier properties, flexibility, adhesiveness, and fatigue resistance by using the graft copolymer.

Solution to Problem

As a result of having conducted diligent research to solve the above problems, the inventors have found that a modified polyvinyl alcohol resin obtainable by introducing as a graft chain a functional group having a specific number of carbon atoms and structure into a polyvinyl alcohol as a main chain having excellent gas barrier properties provides excellent flexibility and adhesiveness effects as in the case of blending a barrier resin and an elastomer component, and that since a bond is formed between polyvinyl alcohol and the functional group having a specific number of carbon atoms and structure by graft polymerization, the strength of the interface between micro-domains is higher than that of the blended system to thereby enhance fatigue resistance. Moreover, they have found that when silica is contained in the modified polyvinyl alcohol resin, the reinforcing properties of the resin composition are enhanced, while silica also acts as an obstacle to permeating gas to thereby further enhance gas barrier properties, and that when a compound having hydroxyl groups and a molecular weight of 10000 or less is further contained, better flexibility can be achieved.

The disclosure has been accomplished based on such findings, and the scope thereof is as follows.

The modified polyvinyl alcohol resin composition of the disclosure comprises a modified polyvinyl alcohol resin obtainable by introducing a linear, alicyclic, branched, or aromatic functional group having 3 to 20 carbon atoms, as a graft chain, into a polyvinyl alcohol as a main chain, and silica.

The modified polyvinyl alcohol resin composition of the disclosure preferably further comprises a compound having hydroxyl groups and a molecular weight of 10000 or less, and more preferably the content of the compound having hydroxyl groups is more than 0 and 150 parts by mass or less, and particularly preferably 5 to 100 parts by mass, based on 100 parts by mass of the modified polyvinyl alcohol resin.

In the modified polyvinyl alcohol resin composition of the disclosure, the content of the silica is preferably 5 to 70 parts by mass based on 100 parts by mass of the modified polyvinyl alcohol resin. This is because a good balance can be achieved between excellent gas barrier properties and excellent flexibility, adhesiveness, and fatigue resistance.

In the modified polyvinyl alcohol resin composition of the disclosure, the proportion of the functional group introduced by graft modification is preferably 0.5 to 50 mol %, and more preferably 1 to 30 mol %, based on the vinyl alcohol unit as a main chain. This is because excellent gas barrier properties and excellent flexibility, adhesiveness, and fatigue resistance can be simultaneously achieved.

Moreover, in the modified polyvinyl alcohol resin composition of the disclosure, preferably an acrylic group-containing oligosilanol group is further grafted on the modified polyvinyl alcohol resin, and the proportion of the introduced acrylic group-containing oligosilanol group is 0.5 to 10 mol % based on the vinyl alcohol unit as the main chain. This is because better adhesiveness can be ensured.

Furthermore, in the modified polyvinyl alcohol resin composition of the disclosure, the molecular weight of the polyvinyl alcohol as the main chain is preferably 10000 or more. This is because better gas barrier properties can be ensured.

The coating of the disclosure comprises the resin composition of the disclosure. With the coating of the disclosure, excellent gas barrier properties, flexibility, adhesiveness, and fatigue resistance can be achieved.

The tire of the disclosure comprises the coating of the disclosure. With the tire of the disclosure, excellent gas barrier properties, flexibility, adhesiveness, and fatigue resistance can be achieved.

Advantageous Effect

According to the disclosure, it is possible to provide a modified polyvinyl alcohol resin composition having high gas barrier properties as well as excellent flexibility, adhesiveness, and fatigue resistance, and, moreover, it is possible to provide a coating and a tire having excellent gas barrier properties, flexibility, adhesiveness, and fatigue resistance by using the modified polyvinyl alcohol resin composition.

DETAILED DESCRIPTION

Below, the disclosure will now be described based on embodiments thereof.
<Modified Polyvinyl Alcohol Resin Composition>

The modified polyvinyl alcohol resin composition of the disclosure comprises a modified polyvinyl alcohol resin and silica. Below, the components of the modified polyvinyl alcohol resin composition of the disclosure will now be described.
(Modified Polyvinyl Alcohol Resin)

The modified polyvinyl alcohol resin composition of the disclosure comprises a modified polyvinyl alcohol resin obtainable by introducing a linear, alicyclic, branched, or aromatic functional group having 3 to 20 carbon atoms, as a graft chain, into a polyvinyl alcohol as a main chain.

With the above configuration, flexibility, adhesiveness, and fatigue resistance can be enhanced while excellent gas barrier properties are maintained.

The main chain consisted of polyvinyl alcohol and the graft chain of a $C_{3-20}$ linear, alicyclic, branched, or aromatic functional group (hereinafter referred to as a "functional group" or "functional group according to the disclosure" as necessary), which constitute the modified polyvinyl alcohol resin, are immiscible each other in a bulk state. Therefore the obtained modified polyvinyl alcohol forms a microphase-separated structure composed of the polyvinyl alcohol and a linear, alicyclic, branched, or aromatic compound having 3 to 20 carbon atoms derived from the above functional group. For example, when the volume fraction of the resin (the polyvinyl alcohol) as a main chain is large, a sea-island structure is formed in which the resin portion falls into the sea and the portion of the compound having a molecular weight of 20 to 10000 falls into the islands, and when the volume fractions are reversed, an inverted sea-island structure is formed.

When the above-described microphase-separated structure is formed, the same effects are obtained as those obtained when both components are blended. That is to say, gas barrier effects due to polyvinyl alcohol are obtained, and also flexibility and adhesiveness can be enhanced due to the effect of the linear, alicyclic, branched, or aromatic group (the portion corresponding to the functional group according to the disclosure) having 3 to 20 carbon atoms.

Moreover, since the polyvinyl alcohol as a main chain and the graft chain consisted of the functional group according to the disclosure, form a chemical bond in the resulting modified polyvinyl alcohol, the strength of the interface between micro-domains is higher than that of the blended system, and, as a result, fatigue resistance can be more enhanced than that of, for example, a conventional blend of a polyvinyl alcohol resin and an elastomer material.

Here, in view of enabling flexibility, adhesiveness, and fatigue resistance to be enhanced while maintaining excellent gas barrier properties, the proportion of the functional group introduced by graft modification is preferably 0.5 to 50 mol % and more preferably 1 to 30 mol % based on the vinyl alcohol unit as the main chain. When the proportion of the introduced functional group is less than 0.5 mol %, the amount of the functional group is not sufficient, and therefore there is a possibility that the desired flexibility, adhesiveness, and fatigue resistance cannot be achieved. On the other hand, when the proportion of the introduced functional group exceeds 50 mol %, the amount of the polyvinyl alcohol is not sufficient, and therefore there is a possibility that the desired gas barrier properties cannot be achieved.

Here, the polyvinyl alcohol is not particularly limited, and it may be a homopolymer composed solely of a vinyl alcohol unit or may be a copolymer (hereinafter sometimes referred to as a "PVA copolymer") composed of vinyl alcohol and a monomer that is copolymerizable therewith. One of these polyvinyl alcohol resins may be used singly, or two or more may be used in combination. The polyvinyl alcohol resins are not particularly limited by the production method thereof, and, for example, a polyvinyl alcohol resin obtained by saponifying a vinyl ester-based polymer such as polyvinyl acetate can be used. Examples of a vinyl ester monomer for forming a vinyl ester unit include vinyl formate, vinyl acetate, vinyl propionate, vinyl valerate, vinyl caprate, vinyl laurate, vinyl stearate, vinyl benzoate, vinyl pivalate, and vinyl versatate. Among these, vinyl acetate is preferable because PVA can be obtained at good productivity.

Examples of the copolymerizable monomer that constitutes the PVA copolymer include α-olefins such as ethylene, propylene, 1-butene, isobutene, and 1-hexene; acrylic acid and salts thereof; acrylic acid esters such as methyl acrylate, ethyl acrylate, n-propyl acrylate, and i-propyl acrylate; methacrylic acid and salts thereof; methacrylic acid esters such as methyl methacrylate, ethyl methacrylate, n-propyl methacrylate, and i-propyl methacrylate; acrylamide and acrylamide derivatives such as N-methylacrylamide and N-ethylacrylamide; methacrylamide and methacrylamide derivatives such as N-methylmethacrylamide and N-ethylmethacrylamide; vinyl ethers such as methyl vinyl ether, ethyl vinyl ether, n-propyl vinyl ether, i-propyl vinyl ether, and n-butyl vinyl ether; vinyl ethers containing hydroxyl groups, such as ethylene glycol vinyl ether, 1,3-propanediol vinyl ether, and 1,4-butanediol vinyl ether; allyl ethers such as allyl acetate, propyl allyl ether, butyl allyl ether, and hexyl allyl ether; monomers having an oxyalkylene group, such as a polyoxyethylene group, a polyoxypropylene group, and a polyoxybutylene group; vinylsilanes such as vinyltrimethoxysilane; α-olefins containing hydroxyl groups or esterification products thereof, such as isopropenyl acetate, 3-buten-1-ol, 4-penten-1-ol, 5-hexen-1-ol, 7-octen-1-ol, 9-decen-1-ol, and 3-methyl-3-buten-1-ol; N-vinylamides such as N-vinylformamide, N-vinylacetamide, and N-vinylpyrrolidone; monomers having a carboxyl group derived from fumaric acid, maleic acid, itaconic acid, maleic anhydride, phthalic anhydride, trimellitic anhydride, itaconic anhydride, or the like; monomers having a sulfonic acid group derived from ethylenesulfonic acid, allylsulfonic acid, methallylsulfonic acid, 2-acrylamide-2-methylpropanesulfonic acid, or the like; and monomers having a cationic group derived from vinyloxyethyl trimethyl ammonium chloride, vinyloxybutyl trimethyl ammonium chloride, vinyloxyethyl dimethylamine, vinyloxymethyl di ethylamine, N-acrylamidemethyl trimethyl ammonium chloride, N-acrylamideethyl trimethyl ammonium chloride, N-acrylamide dimethylamine, allyl trimethyl ammonium chloride, methallyl trimethyl ammonium chloride, dimethyl allylamine, allyl ethylamine, or the like.

The content of the unit of these copolymerizable monomers (hereinafter sometimes referred to as a "comonomer unit") is preferably 20 mol % or less and more preferably 10 mol % or less based on the total of the monomer units constituting the PVA copolymer being 100 mol %. In order to take advantage of copolymerization, the comonomer unit preferably accounts for 0.01 mol % or more.

The polyvinyl alcohol may be completely saponified, or may be partially saponified, i.e., a partially saponified polyvinyl alcohol resin. In view of hue, fisheye reduction, and the surface smoothness of a molding and a film composed of the composition, the degree of saponification is preferably 60 mol % or more, more preferably 95 mol % or more, even more preferably 99 mol % or more, and particularly preferably 99.5 mol % or more.

The molecular weight of the polyvinyl alcohol when the modified polyvinyl alcohol resin composition of the disclosure is used as a coating is preferably 10000 or more and more preferably 100000 or more in terms of ensuring the strength thereof and preventing the entrance of ozone gas.

By being introduced the linear, alicyclic, branched, or aromatic functional group having 3 to 20 carbon atoms, as a graft chain, in the modified polyvinyl alcohol, the modified polyvinyl alcohol resin composition of the disclosure can have flexibility, adhesiveness, and fatigue resistance.

In terms of enabling better flexibility, adhesiveness, and fatigue resistance to be provided, the number of carbon atoms of the functional group used for graft modification is 4 to 18.

Moreover, the functional group has a molecular weight of preferably 20 to 10000 and more preferably 50 to 220.

More specifically, in terms of achieving higher flexibility, adhesiveness, and fatigue resistance, the functional group is preferably a functional group selected from a stearoyl group, a caproyl group, a hexayl group, a lauryl group, a palmityl group, an isovaleryl group, and a cyclohexanecarbonyl group.

It is also possible to graft a group other than the above-described functional group (the linear, alicyclic, branched, or aromatic functional group having a molecular weight of 20 to 10000) on the modified polyvinyl alcohol resin.

For example, in view of further enhancing adhesiveness, preferably, an acrylic group-containing oligosilanol group is further grafted on the polyvinyl alcohol as the main chain, and the proportion of the introduced acrylic group-containing oligosilanol group is 0.5 to 10 mol % based on the vinyl alcohol unit as the main chain.

As for the modified polyvinyl alcohol constituting the coating of the disclosure, a graft reaction method for grafting the linear, alicyclic, branched, or aromatic functional group having a molecular weight of 20 to 10000 on the polyvinyl alcohol as the main chain is not particularly limited, and known organic chemical reactions are usable such as an esterification reaction, an epoxy ring-opening reaction, and an acid anhydride reaction.

An example of the graft reaction method is a method including selecting a compound having a carboxyl group as a grafting compound, and carrying out an esterification reaction between the compound and the polyvinyl alcohol hydroxyl group as the main chain using an esterifying agent.

(Silica)

The resin composition of the disclosure comprises silica in addition to the modified polyvinyl alcohol resin.

Because silica is contained, the reinforcing properties of the resin composition are enhanced, and silica also acts as an obstacle to permeating gas to thereby further enhance gas barrier properties.

Here, the type of silica is not particularly limited. Silica such as general-grade silica or surface-treated special silica can be used according to the application.

Moreover, the shape of silica is also not particularly limited, and silica preferably has a large aspect ratio and a needle, fibrous, or planar shape. This is because the effect as an obstacle to permeating gas is large, and better gas barrier properties can be achieved.

The content of silica is preferably 5 to 70 parts by mass and more preferably 10 to 30 parts by mass based on 100 parts by mass of the modified polyvinyl alcohol resin. When the content of silica is less than 5 parts by mass, the amount of silica is too small, and therefore there is a possibility that the reinforcing effect and the effect of enhancing gas barrier properties cannot be sufficiently exerted. When the content of silica is more than 70 parts by mass, the amount of silica is excessive, and therefore there is a possibility of lowered processability.

(Compound Having Hydroxyl Group)

The resin composition of the disclosure preferably comprises a compound having hydroxyl groups and a molecular weight of 10000 or less in addition to the modified polyvinyl alcohol resin and silica.

When the compound having hydroxyl groups and a molecular weight of 10000 or less is contained, the compound is disposed in the hydrogen bond network formed by polymer chains, and flexibility can be thus enhanced so that the percentage elongation of the resin composition of the disclosure can be further improved.

When the molecular weight of the compound having hydroxyl groups is more than 10000, the melting point is excessively increased and, as a result, there is a possibility that the flexibility of the mixture is lowered.

Here, the type of the compound having hydroxyl groups is not particularly limited as long as the molecular weight is 10000 or less, and, for example, glycerin, ethylene glycol, triethylene glycol, hexanediol, and the like can be used according to the application.

The content of the compound having hydroxyl groups is preferably more than 0 and 150 parts by mass or less and more preferably 5 to 100 parts by mass based on 100 parts by mass of the modified polyvinyl alcohol resin. This is because when the content of the compound having hydroxyl groups is more than 150 parts by mass, there is a possibility that strength and self-supporting properties are lowered in the case of the use as a coating.

(Other Components)

The modified polyvinyl alcohol resin composition of the disclosure can comprise any component as required other than the above-described components.

For example, for the purpose of achieving the desired ornamental characteristics and visibility of the resin composition, various colorants can also be contained in addition to the modified polyvinyl alcohol resin and silica. The colorants are contained to provide a color layer with a color different from that of a rubber layer, and, for example, when the rubber layer is black, a colorant other than black is used.

Here, as the colorants, organic or inorganic pigments or dyes can be used. Examples of inorganic pigments include titanium oxide. Examples of white colorants include titanium oxide, antimony white, and zinc sulfide; examples of red colorants include iron red, cadmium red, minium, mercury sulfide, cadmium, permanent red 4R, lithol red, pyrazolone red, watching red, calcium salt, lake red D, brilliant carmine 6B, eosin lake, rhodamine lake B, alizarin lake, brilliant carmine 3B, and C.I. pigment red 2; examples of blue colorants include C.I. pigment blue 15:3, C.I. pigment blue 15, iron blue, cobalt blue, alkali blue lake, Victoria blue lake, phthalocyanine blue, metal-free phthalocyanine blue, partially chlorinated phthalocyanine blue, fast sky blue, and indanthrene blue BC; and examples of yellow colorants include chrome yellow, zinc yellow, cadmium yellow, yellow iron oxide, mineral fast yellow, nickel titanium yellow, navel orange yellow, naphthol yellow S, Hansa yellow G, Hansa yellow 10G, benzidine yellow G, benzidine yellow GR, quinoline yellow lake, permanent yellow NCG, tartrazine lake, and C.I. pigment yellow 12.

(Coating)

The coating of the disclosure comprises the above-described resin composition of the disclosure.

With the above configuration, the coating of the disclosure can also achieve excellent flexibility, adhesiveness, and fatigue resistance while having high gas barrier properties.

A method for forming the coating of the disclosure by using the resin composition is not particularly limited.

For example, the coating can be formed by applying the resin composition to the rubber surface of a vulcanized tire by a method such as screen printing, ink jet printing, relief printing, or pad printing. The coating layer may be provided on the outer surface of a tire by in-mold forming in which a film formed in advance by applying the resin composition and curing it is inserted at the time of vulcanizing the tire.

(Tire)

The tire of the disclosure comprises the coating of the disclosure.

With the above configuration, the laminate of the disclosure provides the following effects: the formed coating can achieve excellent flexibility and fatigue resistance while having high gas barrier properties, and, moreover, the coating has enhanced adhesiveness to the rubber layer.

As for the application site of the coating, it is possible to apply the coating to, for example, the surface part of the sidewall portions of an inflated tire that has a pair of bead portions, a pair of sidewall portions, a tread portion linking both sidewall portions, a carcass extending in a toroidal manner between bead cores each buried in the bead portions, and a belt placed more toward the outside in the radial direction of the tire than the crown portion of the carcass is.

Here, a rubber composition containing a rubber component having an unsaturated carbon bond in the main chain is preferably applied to the rubber part that is in contact with the coating of the disclosure, in order to ensure adherence to the coating.

Examples of the rubber component having an unsaturated carbon bond for the rubber part include natural rubber and synthetic rubber. Moreover, examples of synthetic rubber include diene-based rubber such as synthetic polyisoprene rubber, styrene butadiene rubber and polybutadiene rubber, as well as butyl rubber and others. One of these rubber components can be used singly, and two or more may be used in combination.

In the rubber composition constituting the rubber part, non-diene-based rubber preferably accounts for 1.5 mass % or more of the rubber component. This is because when non-diene-based rubber accounts for 15 mass % or more of the rubber component, the weather resistance of the rubber layer is greatly enhanced.

The content of an anti-aging agent as an optional component in the rubber composition constituting the rubber part is preferably 0 to 1.5 parts by mass and more preferably less than 1.0 part by mass based on 100 parts by mass of the rubber component. When the content of the anti-aging agent is more than 1.5 parts by mass based on 100 parts by mass of the rubber component, there is a possibility that a large amount of the anti-aging agent migrates toward the surface, and as a result, the curing of a UV-curable coating material by UV rays that is suitably used for the formation of the coating is suppressed to thereby decrease the adherence between the coating and the rubber part. On the other hand, when the content of the anti-aging agent is less than 1.0 part by mass based on 100 parts by mass of the rubber component, the curing of a UV-curable coating material by UV rays is particularly good, and thus the adherence between the coating layer and the rubber layer can be further enhanced.

Examples of the anti-aging agent include N-phenyl-N'-(1,3-dimethylbutyl)-p-phenylenediamine (6PPD), 2,2,4-trimethyl-1,2-dihydroquinoline polymer (TMDQ), 6-ethoxy-2,2,4-trimethyl-1,2-dihydroquinoline (AW), N,N'-diphenyl-p-phenylenediamine (DPPD), N,N'-di-sec-butyl-p-phenylenediamine, and N-phenyl-N'-(methylheptyl)-p-phenylenediamine.

In addition to the above-described rubber component and anti-aging agent, fillers such as carbon black, vulcanizing agents such as sulfur, and additives commonly used in rubber industry such as a vulcanization accelerator, process oil, an anti-scorching agent, zinc white, and stearic acid can be suitably selected and added as necessary to the rubber composition constituting the rubber part as long as the effect of the disclosure is not impaired. Commercially available products can be suitably used as these additives.

The rubber composition can be produced by, for example, kneading the rubber component with various additives suitably selected as necessary, followed by heating and extrusion.

As for the tire of the disclosure, the laminate of the disclosure can be applied to the sidewall portions, and, the laminate is also applicable to, for example, the inner liner of the tire.

EXAMPLE

Below, the disclosure will now be described in more detail by of Examples, but the disclosure is not limited thereto.

Examples 1-1 to 1-3

1 g of PVA particles (manufactured by Kuraray Co., Ltd., Poval PVA 117) were thermally dissolved in 30 mL of DMSO (dimethyl sulfoxide), and then stearvl acid was added thereto in an amount shown in Table 1 (Amount of compound for functional group added (g)). 0.8 g of 1-ethyl-3-(3-dimethylaminopropyl)carbodiimide hydrochloride was added thereto, and the resultant was stirred at 40° C. for 6 hours. Reprecipitation of the reaction solution using 500 mL of methanol and filtration were repeated twice, and solids were recovered and dried to thereby obtain the modified polyvinyl alcohol sample of each Example.

A resin composition sample containing 20 parts by mass of silica (manufactured by Tosoh Silica Corporation, "Nipsil LP") based on 100 parts by mass of the above sample was prepared.

Table 1 also shows the molecular weight ($\times 10^3$) of the main chain in the modified polyvinyl alcohol and the proportion (mol %) of the functional group introduced in the modified polyvinyl alcohol.

Examples 1-4 to 1-7

1 g of PVA particles (manufactured by Kuraray Co., Ltd., Poval PVA 117) were thermally dissolved in 30 mL of DMSO (dimethyl sulfoxide), and then caproic acid was added thereto in an amount shown in Table 1 (Amount of compound for functional group added (g)). 0.3 g of 1-ethyl-3-(3-dimethylaminopropyl)carbodiimide hydrochloride was added thereto, and the resultant was stirred at 40° C. for 6 hours. Reprecipitation of the reaction solution using 500 mL of methanol and filtration were repeated twice, and solids were recovered and dried to thereby obtain the modified polyvinyl alcohol sample of each Example.

A resin composition sample containing 20 parts by mass of silica (manufactured by Tosoh Silica Corporation, "Nipsil LP") based on 100 parts by mass of the above sample was prepared.

Table 1 also shows the molecular weight ($\times 10^3$) of the main chain in the modified polyvinyl alcohol and the proportion (mol %) of the functional group introduced in the modified polyvinyl alcohol.

Examples 1-8 and 1-10

1 g of PVA particles (manufactured by Kuraray Co., Ltd., Poval PVA 117) were thermally dissolved in 30 mL of DMSO (dimethyl sulfoxide), and then oleic acid was added thereto in an amount shown in Table 1 (Amount of compound for functional group added (g)). 0.8 g of 1-ethyl-3-(3-dimethylaminopropyl)carbodiimide hydrochloride was added thereto, and the resultant was stirred at 40° C. for 6 hours. Reprecipitation of the reaction solution using 500 mL of methanol and filtration were repeated twice, and solids were recovered and dried to thereby obtain the modified polyvinyl alcohol sample of each Example.

A resin composition sample containing 20 parts by mass of silica (manufactured by Tosoh Silica Corporation, "Nipsil LP") based on 100 parts by mass of the above sample was prepared.

Table 1 also shows the molecular weight ($\times 10^3$) of the main chain in the modified polyvinyl alcohol and the proportion (mol %) of the functional group introduced in the modified polyvinyl alcohol.

Example 1-9

1 g of PVA particles (manufactured by Kuraray Co., Ltd., Poval VA 117) were thermally dissolved in 30 mL of DMSO (dimethyl sulfoxide), and then benzoic acid was added thereto in an amount shown in Table 1 (Amount of compound for functional group added (g)). 0.3 g of 1-ethyl-3-(3-dimethylaminopropyl)carbodiimide hydrochloride was added thereto, and the resultant was stirred at 40° C. for 6 hours. Reprecipitation of the reaction solution using 500 mL of methanol and filtration were repeated twice, and solids were recovered and dried to thereby obtain the modified polyvinyl alcohol sample of the Example.

A resin composition sample containing 20 parts by mass of silica (manufactured by Tosoh Silica Corporation, "Nipsil LP") based on 100 parts by mass of the above sample was prepared.

Table 1 also shows the molecular weight ($\times 10^3$) of the main chain in the modified polyvinyl alcohol and the proportion (mol %) of the functional group introduced in the modified polyvinyl alcohol.

Examples 1-11 and 1-12

1 g of PVA particles (manufactured by Kuraray Co., Ltd., Poval PVA 117) were thermally dissolved in 30 mL of DMSO (dimethyl sulfoxide), and then cyclohexanecarboxylic acid was added thereto in an amount shown in Table 1 (Amount of compound for functional group added (g)). 0.3 g of 1-ethyl-3-(3-dimethylaminopropyl)carbodiimide hydrochloride was added thereto, and the resultant was stirred at 40° C. for 6 hours. Reprecipitation of the reaction solution using 500 mL of methanol and filtration were repeated twice, and solids were recovered and dried to thereby obtain the modified polyvinyl alcohol sample of each Example.

A resin composition sample containing 20 parts by mass of silica (manufactured by Tosoh Silica Corporation, "Nipsil LP") based on 100 parts by mass of the above sample was prepared.

Table 1 also shows the molecular weight ($\times 10^3$) of the main chain in the modified polyvinyl alcohol and the proportion (mol %) of the functional group introduced in the modified polyvinyl alcohol.

Examples 1-13 and 1-14

1 g of PVA particles (Kuraray Co., Ltd., Poval PVA 117) were thermally dissolved in 30 mL of DMSO (dimethyl sulfoxide), and then stearyl acid and a silane coupling agent (manufactured by Shin-Etsu Chemical Co., Ltd., KBM 503 (3-methacryloxypropyltriethoxysilane) or KBM 5103 (3-acryloxypropyltrimethoxysilane)) were added thereto in amounts (Amount of compound for functional group added (g)) shown in Table 1. 0.8 g of 1-ethyl-3-(3-dimethylaminopropyl)carbodiimide hydrochloride was added thereto, and the resultant was stirred at 40° C. for 6 hours. Reprecipitation of the reaction solution using 500 mL of methanol and filtration were repeated twice, and solids were recovered and dried to thereby obtain the modified polyvinyl alcohol sample of each Example.

A resin composition sample containing 20 parts by mass of silica (manufactured by Tosoh Silica Corporation, "Nipsil LP") based on 100 parts by mass of the above sample was prepared.

Table 1 also shows the molecular weight ($\times 10^3$) of the main chain in the modified polyvinyl alcohol and the proportion (mol %) of the functional group introduced in the modified polyvinyl alcohol.

Comparative Example 1-1

1 g of ethylene vinyl alcohol (manufactured by Kuraray Co., Ltd., Eval F 101B) was thermally dissolved in 30 mL of DMSO (dimethyl sulfoxide), and then glycidylpropoxide was added thereto in an amount (Amount of compound for functional group added (g)) shown in Table 1. Then 0.01 g of (pentafluorophenyl)boron was added thereto, and the resultant was stirred at 80° C. for 6 hours. Reprecipitation of the reaction solution using 500 mL of methanol and filtration were repeated twice, and solids were recovered and dried to thereby obtain the modified polyvinyl alcohol sample of Comparative Example 1-1.

A resin composition sample containing 20 parts by mass of silica (manufactured by Tosoh Silica Corporation, "Nipsil LP") based on 100 parts by mass of the above sample was prepared.

Table 1 also shows the molecular weight ($\times 10^3$) of the main chain in the modified polyvinyl alcohol and the proportion (mol %) of the functional group introduced in the modified polyvinyl alcohol.

Comparative Example 1-2

In Comparative Example 1-2, PVA (manufactured by Kuraray Co., Ltd., Poval PVA 117) was provided as a sample as shown in Table 1.

A resin composition sample containing 20 parts by mass of silica (manufactured by Tosoh Silica Corporation, "Nipsil LP") based on 100 parts by mass of the above sample was prepared.

Comparative Example 1-3

1 g of PVA particles (manufactured by Kuraray Co., Ltd., Poval PVA 117) were thermally dissolved in 30 mL of DMSO (dimethyl sulfoxide), and then acetic acid was added thereto in an amount shown in Table 1 (Amount of compound for functional group added (g)). 0.3 g of 1-ethyl-3-(3-dimethylaminopropyl)carbodiimide hydrochloride was added thereto, and the resultant was stirred at 40° C. for 6 hours. Reprecipitation of the reaction solution using 500 mL of methanol and filtration were repeated twice, and solids were recovered and dried to thereby obtain the modified polyvinyl alcohol sample of Comparative Example 1-3.

A resin composition sample containing 20 parts by mass of silica (manufactured by Tosoh Silica Corporation, "Nipsil LP") based on 100 parts by mass of the above sample was prepared.

Table 1 also shows the molecular weight ($\times 10^3$) of the main chain in the modified polyvinyl alcohol and the proportion (mol %) of the functional group introduced in the modified polyvinyl alcohol.

Comparative Example 1-4

1 g of PVA particles (manufactured by Kuraray Co., Ltd., Poval PVA 117) were thermally dissolved in 30 mL of DMSO (dimethyl sulfoxide), and then docosanoic acid was added thereto in an amount shown in Table 1 (Amount of compound for functional group added (g)). 0.9 g of 1-ethyl-3-(3-dimethylaminopropyl)carbodiimide hydrochloride was added thereto, and the resultant was stirred at 40° C. for 6 hours. Reprecipitation of the reaction solution using 500 mL of methanol and filtration were repeated twice, and solids were recovered and dried to thereby obtain the modified polyvinyl alcohol sample of Comparative Example 1-4.

A resin composition sample containing 20 parts by mass of silica (manufactured by Tosoh Silica Corporation, "Nipsil LP") based on 100 parts by mass of the above sample was prepared.

Table 1 also shows the molecular weight ($\times 10^3$) of the main chain in the modified polyvinyl alcohol and the proportion (mol %) of the functional group introduced in the modified polyvinyl alcohol.

Comparative Example 1-5

The modified polyvinyl alcohol sample of Comparative Example 1-5 was prepared under the same conditions as in the Examples except that silica was not added.

Table 1 shows the amount (g) of a compound for functional group added, the molecular weight ($\times 10^3$) of the main chain in the modified polyvinyl alcohol, and the proportion (mol %) of the functional group introduced in the modified polyvinyl alcohol.

TABLE 1

| | Modified polyvinyl alcohol resin | | | | | Amount |
|---|---|---|---|---|---|---|
| Sample No. | Type of main chain | Type of functional group | Molecular weight of main chain ($\times 10^3$) | Proportion of functional group introduced (mol %) | Amount of compound for functional group added (g) | of silica contained based on resin (parts by mass) |
| Comparative Example 1-1 | EVOH | Propylepoxy group | 20 | 5 | 0.1 | 20 |
| Comparative Example 1-2 | PVA | — | 50 | 0 | 0 | 20 |
| Comparative Example 1-3 | PVA | Acetyl group | 50 | 10 | 0.1 | 20 |
| Comparative Example 1-4 | PVA | Docosaroyl group | 50 | 1 | 0.05 | 20 |
| Comparative Example 1-5 | PVA | Stearoyl group | 50 | 5 | 2.5 | 0 |
| Example 1-1 | PVA | Stearoyl group | 50 | 0.4 | 0.03 | 20 |
| Example 1-2 | PVA | Stearoyl group | 50 | 1 | 0.5 | 20 |
| Example 1-3 | PVA | Stearoyl group | 50 | 5 | 2.5 | 20 |
| Example 1-4 | PVA | Caproyl group | 50 | 10 | 0.3 | 20 |
| Example 1-5 | PVA | Caproyl group | 50 | 20 | 0.6 | 20 |
| Example 1-6 | PVA | Caproyl group | 50 | 50 | 1.5 | 20 |
| Example 1-7 | PVA | Caproyl group | 50 | 60 | 1.8 | 20 |
| Example 1-8 | PVA | Olenoyl group | 50 | 5 | 0.4 | 20 |

TABLE 1-continued

| | | Modified polyvinyl alcohol resin | | | | Amount |
|---|---|---|---|---|---|---|
| Sample No. | Type of main chain | Type of functional group | Molecular weight of main chain (×10³) | Proportion of functional group introduced (mol %) | Amount of compound for functional group added (g) | of silica contained based on resin (parts by mass) |
| Example 1-9 | PVA | Benzoyl group | 50 | 10 | 0.5 | 20 |
| Example 1-10 | PVA | Olenoyl group | 50 | 10 | 0.3 | 20 |
| Example 1-11 | PVA | Cyclohexanecarbonyl group | 50 | 10 | 0.5 | 20 |
| Example 1-12 | PVA | Cyclohexanecarbonyl group | 50 | 10 | 0.5 | 50 |
| Example 1-13 | PVA | Stearoyl group + methacrylic group | 50 | 5 + 1 | 2.5 + 0.5 | 20 |
| Example 1-14 | PVA | Stearoyl group + acrylic group | 50 | 5 + 1 | 2.5 + 0.5 | 20 |

<Evaluation>

(1) Gas Barrier Properties (Oxygen Permeability)

Each resin composition sample of the Examples and Comparative Examples was processed into a circular shape having a diameter of 50 mm and a thickness of 20 µm, and the oxygen permeability was measured under conditions of a humidity of 0% and a temperature of 25° C. using an OX-TRAN Model 2/20 manufactured by Modern Controls, Inc. Measurement results are shown in Table 2. The smaller the numerical value of the oxygen permeability is, the better the result is.

(2-1) Flexibility—1 (Elongation at Break)

As for each resin composition sample of the Examples and Comparative Examples, a specimen having a thickness of 0.5 mm was prepared, and the elongation at break (Eb) was measured based on JIS 7161. Specifically, the elongation at break (%) when the specimen was stretched at a rate of 50 mm/min was measured. Measurement results are shown in Table 2. The larger the numerical value of the elongation at break is, the better the result is.

(2-2) Flexibility—2 (Tensile Strength)

As for each resin composition sample of the Examples and Comparative Examples, a specimen having a thickness of 0.5 mm was prepared, and the tensile strength (Tb) was measured based on JIS K 6251. Specifically, a dumb-bell specimen (#3) was stretched at a specified rate (50±2.5 mm/min) until break using a tensile tester. At that time, the maximum tensile force required for break was measured. Measurement results are shown in Table 2. The larger the numerical value of the tensile strength is, the better the result is.

(3) Interlayer Adhesiveness (Peel Adhesion)

Each resin composition sample of the Examples and Comparative Examples was laminated to form a film having a film thickness of 100 µm on the surface of a rubber element NR/BR vulcanized rubber) to prepare a laminate specimen.

Then, each laminate specimen was subjected to a 90° peel test at a tensile rate of 5 cm/min in accordance with JIS K 6854 (1999) to measure the peel adhesion of the film. Measurement results are shown in Table 2. The larger the numerical value of the peel adhesion of the film is, the better the result is.

(4) Discoloration Preventing Effect—On the Assumption of the Use as a Tire Sidewall (Chromaticity Difference)

A sidewall rubber containing an anti-aging agent was processed to have a thickness of 2.0 mm, each sample of the Examples and Comparative Examples was laminated to form a film having a film thickness of 0.05 mm on the processed rubber, followed by laminating a white layer (titanium oxide-containing resin ink) having a film thickness of 0.1 mm on the film to thereby prepare a laminate sample.

The prepared laminate sample was left to stand in an environment having a temperature of 60° C., brought back to room temperature every day and irradiated with UV light at 3 J/cm², and then the chromaticity of the white layer was measured. The chromaticity after leaving the sample to stand for 20 days and the chromaticity after leaving the sample to stand for 60 days were measured to calculate the chromaticity difference from the beginning of leaving the sample. The resulting chromaticity difference (ΔE) is shown in Table 2. The smaller the numerical value of chromaticity difference is, the better the result is.

(5) Fatigue Resistance (The Bending Number of Times)

Each sample film (a thickness of 0.5 mm) of the Examples and Comparative Examples was cut to prepare 50 sheets each having 21 cm×30 cm. Each cut film was moisture-controlled at 0° C. for 7 days, and then bended 50 times, 75 times, 100 times, 125 times, 150 times, 175 times, 200 times, 225 times, 250 times, 300 times, 400 times, 500 times, 600 times, 700 times, 800 times, 1000 times, and 1500 times in accordance with ASTM F392-74 using a Gelboflex tester manufactured by RKC Instrument Inc., and then the number of pinholes was measured. In the respective bending number of times, measurement was performed 5 times, and the average thereof was regarded as the number of pinholes. The measurement results were plotted such that the bending number of times (P) was indicated on the abscissa and the number of pinholes (N) was indicated on the ordinate, and the bending number of times (Np1) that resulted in one pinhole was obtained by extrapolation to two significant figures. However, for films that did not show a pinhole after being flexed 1500 times, the bending number of times was then increased by increments of 500 times, and the bending number of times that resulted in a pinhole was regarded as Np1.

Evaluation results were presented as an index relative to the bending number of times of Comparative Example 1-1 being 100, and a larger numerical value indicates a larger bending number of times and thus a higher fatigue resistance.

TABLE 2

| Sample No. | Oxygen permeability index | Elongation at break (Eb) index | Tensile strength (Tb) index | Peel adhesion index | Chromaticity difference after 20 days (ΔE) | Chromaticity difference after 60 days (ΔE) | Bending number of times |
|---|---|---|---|---|---|---|---|
| Comparative Example 1-1 | 100 | 100 | 100 | 100 | 1 | 3 | 100 |
| Comparative Example 1-2 | 0.3 | 5 | 17 | 43 | 1 | 3 | 30 |
| Comparative Example 1-3 | 1 | 7 | 158 | 43 | 1 | 3 | 30 |
| Comparative Example 1-4 | 3.3 | 10 | 133 | 50 | 1 | 10 | 60 |
| Comparative Example 1-5 | 33 | 50 | 67 | 143 | 1 | 10 | 100 |
| Example 1-1 | 1.7 | 50 | 133 | 143 | 1 | 3 | 120 |
| Example 1-2 | 3.3 | 60 | 133 | 171 | 1 | 3 | 120 |
| Example 1-3 | 0 | 70 | 133 | 214 | 1 | 3 | 150 |
| Example 1-4 | 1.7 | 100 | 117 | 171 | 1 | 3 | 150 |
| Example 1-5 | 3.3 | 120 | 117 | 157 | 1 | 1 | 150 |
| Example 1-6 | 6.7 | 150 | 117 | 214 | 1 | 3 | 170 |
| Example 1-7 | 8.3 | 200 | 117 | 286 | 1 | 3 | 170 |
| Example 1-8 | 6.7 | 100 | 158 | 171 | 1 | 3 | 120 |
| Example 1-9 | 3.3 | 100 | 150 | 186 | 1 | 3 | 120 |
| Example 1-10 | 6.7 | 70 | 150 | 143 | 1 | 3 | 120 |
| Example 1-11 | 6.7 | 120 | 133 | 157 | 1 | 3 | 110 |
| Example 1-12 | 6.7 | 120 | 158 | 157 | 1 | 3 | 120 |
| Example 1-13 | 0 | 70 | 133 | 2000 | 1 | 1 | 150 |
| Example 1-14 | 0 | 70 | 133 | 5000 | 1 | 3 | 150 |

The following was found from Table 2.
(1) It was found that the resin composition samples having a polyvinyl alcohol main chain (Examples 1-1 to 1-11 and Comparative Examples 1-2 to 1-4) have higher gas barrier properties than the resin composition sample having an ethylene vinyl alcohol main chain (Comparative Example 1-1). Also, it was found that the samples containing silica in a resin composition (Examples 1-1 to 1-11) have higher gas barrier properties than the sample not containing silica (Comparative Example 1-5).
(2) As for flexibility, it was found that the resin composition samples of Examples 1-1 to 1-11 have greater elongation at break and tensile strength than the samples of Comparative Examples 1-2 to 1-4 and thus excellent flexibility. This is considered to be the action of the grafted functional group. Also, it was found that the resin composition sample of Comparative Example 1-1 shows a good result with respect to flexibility.
(3) As for peel adhesiveness, it was found that the resin composition samples of Examples 1-1 to 1-11 have stronger adhesion than the samples of Comparative Examples 1-1 to 1-4. The flexibility of the compositions and hydrophobicity provided by the functional group are considered to contribute to this. In particular, it is considered that hydrophobing the resin compositions causes a hydrophobic interaction with the rubber substrate and contributes to adhering.
Also, it was found that by introducing a coupling agent into a primer, adhesion to ink is enhanced, and an acrylic group is more reactive than a methacrylic group, which is reflected in adhesion.
(4) As for the discoloration preventing effect, it was found that the discoloration of the resin composition samples of Examples 1-1 to 1-11 is more suppressed than the resin composition sample of Comparative Example 1-4, and is also comparable to that of the sample composed of polyvinyl alcohol (Comparative Example 1-2).
(5) As for fatigue resistance, it was found that the resin composition samples of Examples 1 to 11 have stronger fatigue resistance than the samples of Comparative Examples 1-2 to 1-4, and the enhancement of flexibility in the modified polyvinyl alcohol resin also leads to the enhancement of fatigue resistance.

Example 2

Examples 2-1 to 2-10

1 g of PVA particles (manufactured by Kuraray Co., Ltd., Poval PVA 117) were thermally dissolved in 30 mL of DMSO (dimethyl sulfoxide), and then stearic acid was added thereto in an amount shown in Table 3 (Amount of compound for functional group added (g)). 0.8 g of 1-ethyl-3(3-dimethylaminopropyl)carbodiimide hydrochloride was added thereto, and the resultant was stirred at 40° C. for 6 hours, Reprecipitation of the reaction solution using 500 mL of methanol and filtration were repeated twice, and solids were recovered and dried to thereby obtain the modified polyvinyl alcohol sample of each Example was obtained.
A resin composition sample containing silica (manufactured by Tosoh Silica Corporation, "Nipsil LP") and a low molecular weight compound in an amount shown in Table 3 based on 100 parts by mass of the above modified polyvinyl alcohol sample was prepared.

Table 3 also shows the molecular weight ($\times 10^3$) of the main chain in the modified polyvinyl alcohol and the proportion (mol %) of the functional group introduced in the modified polyvinyl alcohol.

Example 2-11

1 g of PVA particles (manufactured by Kuraray Co., Ltd., Poval PVA 117) were thermally dissolved in 30 mL of DMSO (dimethyl sulfoxide), and then caproic acid was added thereto in an amount shown in Table 3 (Amount of compound for functional group added (g)). 0.3 g of 1-ethyl-3-(3-dimethylaminopropyl)carbodiimide hydrochloride was added thereto, and the resultant was stirred at 40° C. for 6 hours. Reprecipitation of the reaction solution using 500 mL of methanol and filtration were repeated twice, and solids were recovered and dried to thereby obtain the modified polyvinyl alcohol sample of the Example.

A resin composition sample containing silica by Tosoh Silica Corporation, "Nipsil LP") and a low molecular weight compound in an amount shown in Table 3 based on 100 parts by mass of the above modified polyvinyl alcohol sample was prepared.

Table 3 also shows the molecular weight ($\times 10^3$) of the main chain in the modified polyvinyl alcohol and the proportion (mol %) of the functional group introduced in the modified polyvinyl alcohol.

Examples 2-12, 2-14

1 g of PVA particles (manufactured by Kuraray Co., Ltd., Poval PVA 117) were thermally dissolved in 30 mL of DMSO (dimethyl sulfoxide), and then oleic acid was added only in an amount shown in Table 3 (Amount of compound for functional group added (g)). 0.8 g of 1-ethyl-3-(3-dimethylaminopropyl)carbodiimide hydrochloride was added thereto, and the resultant was stirred at 40° C. for 6 hours. Reprecipitation of the reaction solution using 500 mL of methanol and filtration were repeated twice, and solids were recovered and dried to thereby obtain the modified polyvinyl alcohol sample of each Example.

A resin composition sample containing silica (manufactured by Tosoh Silica Corporation, "Nipsil LP")) and a low molecular weight compound in an amount shown in Table 3 based on 100 parts by mass of the above modified polyvinyl alcohol sample was prepared.

Table 3 also shows the molecular weight ($\times 10^3$) of the main chain in the modified polyvinyl alcohol and the proportion (mol %) of the functional group introduced in the modified polyvinyl alcohol.

Example 2-13

1 g of PVA particles (manufactured by Kuraray Co., Ltd., Poval PVA 117) were thermally dissolved in 30 mL of DMSO (dimethyl sulfoxide), and then benzoic acid was added thereto in an amount shown in Table 3 (Amount of compound for functional group added (g)). 0.3 g of 1-ethyl-3-(3-dimethylaminopropyl)carbodiimide hydrochloride was added thereto, and the resultant was stirred at 40° C. for 6 hours. Reprecipitation of the reaction solution using 500 mL of methanol and filtration were repeated twice, and solids were recovered and dried to thereby obtain the modified polyvinyl alcohol sample of the Example.

A resin composition sample containing silica (manufactured by Tosoh Silica Corporation, "Nipsil LP") and a low molecular weight compound in an amount shown in Table 3 based on 100 parts by mass of the above modified polyvinyl alcohol sample was prepared.

Table 3 also shows the molecular weight ($\times 10^3$) of the main chain in the modified polyvinyl alcohol and the proportion (mol %) of the functional group introduced in the modified polyvinyl alcohol.

Example 2-15

1 g of PVA particles (manufactured by Kuraray Co., Ltd., Poval PVA 117) were thermally dissolved in 30 mL of DMSO (dimethyl sulfoxide), and then cyclohexanecarboxylic acid was added only in an amount shown in Table 3 (Amount of compound for functional group added (g)). 0.3 g of 1-ethyl-3-(3-dimethylaminopropyl)carbodiimide hydrochloride was added thereto, and the resultant was stirred at 40° C. for 6 hours. Reprecipitation of the reaction solution using 500 mL of methanol and filtration were repeated twice, and solids were recovered and dried to thereby obtain the modified polyvinyl alcohol sample of the Example.

A resin composition sample containing silica (manufactured by Tosoh Silica Corporation, "Nipsil LP") and a low molecular weight compound in an amount shown in Table 3 based on 100 parts by mass of the above modified polyvinyl alcohol sample was prepared.

Table 3 also shows the molecular weight ($\times 10^3$) of the main chain in the modified polyvinyl alcohol and the proportion (mol %) of the functional group introduced in the modified polyvinyl alcohol.

Examples 2-16 and 2-17

1 g of PVA particles (Kuraray Co., Ltd., Poval PVA 117) were thermally dissolved in 30 mL of DMSO (dimethyl sulfoxide), and then stearyl acid and a silane coupling agent (manufactured by Shin-Etsu Chemical Co., Ltd., KBM 503 (3-methacryloxypropyltriethoxysilane) or KBM 5103 (3-acryloxypropyltrimethoxysilane)) were added thereto in amounts (Amount of compound for functional group added (g)) shown in Table 3. 0.8 g of 1-ethyl-3(3-dimethylaminopropyl)carbodiimide hydrochloride was added thereto, and the resultant was stirred at 40° C. for 6 hours. Reprecipitation of the reaction solution using 500 mL of methanol and filtration were repeated twice, and solids were recovered and dried to thereby obtain the modified polyvinyl alcohol sample of each Example.

A resin composition sample containing silica (manufactured by Tosoh Silica Corporation, "Nipsil LP") and a low molecular weight compound in an amount shown in Table 3 based on 100 parts by mass of the above modified polyvinyl alcohol sample was prepared.

Table 3 also shows the molecular weight ($\times 10^3$) of the main chain in the modified polyvinyl alcohol and the proportion (mol %) of the functional group introduced in the modified polyvinyl alcohol.

TABLE 3

| | Modified polyvinyl alcohol resin | | | | Silica Amount of silica contained based on resin (parts by mass) | Hydroxyl group-containing compound with low molecular weight | |
|---|---|---|---|---|---|---|---|
| Sample No. | Type of main chain | Type of functional group | Molecular weight of main chain (×10³) | Proportion of functional group introduced (mol %) | Amount of compound for functional group added (g) | Type | Amount contained (parts by mass) |
| Example 2-1 | PVA | Stearoyl group | 50 | 20 | 0.6 | 20 | Glycerin | 3 |
| Example 2-2 | PVA | Stearoyl group | 50 | 20 | 0.6 | 20 | Glycerin | 5 |
| Example 2-3 | PVA | Stearoyl group | 50 | 20 | 0.6 | 20 | Glycerin | 10 |
| Example 2-4 | PVA | Stearoyl group | 50 | 20 | 0.6 | 20 | Glycerin | 20 |
| Example 2-5 | PVA | Stearoyl group | 50 | 20 | 0.6 | 20 | Glycerin | 50 |
| Example 2-6 | PVA | Stearoyl group | 50 | 20 | 0.6 | 20 | Glycerin | 100 |
| Example 2-7 | PVA | Stearoyl group | 50 | 20 | 0.6 | 20 | Glycerin | 110 |
| Example 2-8 | PVA | Stearoyl group | 50 | 20 | 0.6 | 20 | Ethylene glycol | 50 |
| Example 2-9 | PVA | Stearoyl group | 50 | 20 | 0.6 | 20 | Triethylene glycol | 50 |
| Example 2-10 | PVA | Stearoyl group | 50 | 20 | 0.6 | 20 | Hexanediol | 50 |
| Example 2-11 | PVA | Caproyl group | 50 | 60 | 1.8 | 20 | Glycerin | 50 |
| Example 2-12 | PVA | Olenoyl group | 50 | 15 | 1.2 | 50 | Glycerin | 50 |
| Example 2-13 | PVA | Benzoyl group | 50 | 10 | 0.5 | 20 | Glycerin | 50 |
| Example 2-14 | PVA | Olenoyl group | 50 | 10 | 0.8 | 20 | Glycerin | 50 |
| Example 2-15 | PVA | Cyclohexanecarbonyl group | 50 | 10 | 0.5 | 50 | Glycerin | 50 |
| Example 2-16 | PVA | Stearoyl group + KBM503 | 50 | 20 + 1 | 0.6 + 0.5 | 20 | Glycerin | 50 |
| Example 2-17 | PVA | Stearoyl group + KBM5103 | 50 | 20 + 1 | 0.6 + 0.5 | 20 | Glycerin | 50 |

<Evaluation>
(1) Gas Barrier Properties (Oxygen Permeability)

Each resin composition sample of the Examples and Comparative Examples was processed into a circular shape having a diameter of 50 mm and a thickness of 20 μm, and the oxygen permeability was measured under conditions of a humidity of 0% and a temperature of 25° C. using an OX-TRAN Model 2/20 manufactured by Modern Controls, Inc. Measurement results are shown in Table 4. The smaller the numerical value of the oxygen permeability is, the better the result is.

(2) Flexibility (Elongation at Break)

As for each resin composition sample of the Examples and Comparative Examples, a specimen having a thickness of 0.5 mm was prepared, and the elongation at break (Eb) was measured based on MS 7161. Specifically, the elongation at break (%) when the specimen was stretched at a rate of 50 mm/min was measured. Measurement results are shown in Table 4. The larger the numerical value of the elongation at break is, the better the result is.

(3) Elongation at Yield

As for each resin composition sample of the Examples and Comparative Examples, the elongation at yield was measured from a strain-stress curve measured based on JIS 7161. Measurement results are shown in Table 4. The larger the numerical value of the elongation at yield is, the better the result is.

(4) Interlayer Adhesiveness (Peel Adhesion)

Each resin composition sample of the Examples and Comparative Examples was laminated to form a film having a film thickness of 100 μm on the surface of a rubber element (NR/BR vulcanized rubber) to prepare a laminate specimen.

Then, each laminate specimen was subjected to a 90° peel test at a tensile rate of 5 cm/min in accordance with JIS K 6854 (1999) to measure the peel adhesion of the film. Measurement results are shown in Table 4. The larger the numerical value of the peel adhesion of the film is, the better the result is.

(5) Discoloration Preventing Effect—On the Assumption of the Use as a Tire Sidewall (Chromaticity Difference)

As shown in Table 4, sidewall rubber containing an anti-aging agent was processed to have a thickness of 2.0 mm, each sample of the Examples and Comparative Examples was laminated to form a film having a film thickness of 0.05 mm on the processed rubber, followed by laminating a white layer (titanium oxide-containing resin ink) having a film thickness of 0.1 mm on the film to thereby prepare a laminate sample.

The prepared laminate sample was left to stand in an environment having a temperature of 60° C., brought back to room temperature every day and irradiated with UV light at 3 J/cm², and then the chromaticity of the white layer was measured. The chromaticity after leaving the sample to stand for 20 days and the chromaticity after leaving the sample to stand for 60 days were measured to calculate the chromaticity difference from the beginning of leaving the sample. The resulting chromaticity difference (ΔE) is shown in Table 4. The smaller the numerical value of chromaticity difference is, the better the result is.

(6) Fatigue Resistance (The Bending Number of Times)

Each sample film (a thickness of 0.5 mm) of the Examples and Comparative Examples was cut to prepare 50 sheets each having 21 cm×30 cm. Each cut film was moisture-controlled at 0° C. for 7 days, and then bended 50 times, 75 times, 100 times, 125 times, 150 times, 175 times, 200 times, 225 times, 250 times, 300 times, 400 times, 500 times, 600 times, 700 times, 800 times, 1000 times, and 1500 times in accordance with ASTM F392-74 using a Gelboflex tester manufactured by RKC Instrument Inc., and then the number of pinholes was measured. In the respective numbers of flexes, measurement was performed 5 times, and the average thereof was regarded as the number of pinholes. The measurement results were plotted such that the bending number of times (P) was indicated on the abscissa and the number of pinholes (N) was indicated on the ordinate, and the bending number of times (Np1) that resulted in one pinhole was obtained by extrapolation to two significant figures. However, for films that did not show a pinhole after being flexed 1500 times, the bending number of times was then increased by increments of 500 times, and the bending number of times that resulted in a pinhole was regarded as Np1.

Evaluation results were presented as an index relative to the bending number of times of Comparative Example 1 being 100, and a larger numerical value indicates a larger bending number of times and a higher fatigue resistance.

TABLE 4

| Sample No. | Evaluation | | | | | | |
|---|---|---|---|---|---|---|---|
| | Oxygen permeability index | Elongation at break (Eb) index | Elongation at yield index | Peel adhesion index | Chromaticity difference after 20 days (ΔE) | Chromaticity difference after 60 days (ΔE) | Bending number of times |
| Example 2-1 | 2.3 | 120 | 500 | 143 | 1 | 3 | 110 |
| Example 2-2 | 2.3 | 150 | 667 | 143 | 1 | 3 | 115 |
| Example 2-3 | 3.3 | 200 | 833 | 136 | 1 | 3.5 | 117 |
| Example 2-4 | 5 | 230 | 1000 | 129 | 1 | 3.7 | 120 |
| Example 2-5 | 16.7 | 250 | 1100 | 121 | 1 | 4 | 125 |
| Example 2-6 | 23 | 270 | 1667 | 119 | 1 | 4.3 | 150 |
| Example 2-7 | 25 | 280 | 1700 | 110 | 1 | 4.5 | 155 |
| Example 2-8 | 16.7 | 250 | 1100 | 121 | 1 | 4 | 125 |
| Example 2-9 | 16.7 | 250 | 1100 | 121 | 1 | 4 | 125 |
| Example 2-10 | 16.7 | 250 | 1100 | 121 | 1 | 4 | 125 |
| Example 2-11 | 20 | 200 | 1100 | 140 | 1 | 5 | 150 |
| Example 2-12 | 17 | 250 | 1100 | 135 | 1 | 4 | 120 |
| Example 2-13 | 16 | 250 | 1100 | 130 | 1 | 4 | 120 |
| Example 2-14 | 16.7 | 250 | 1100 | 121 | 1 | 4 | 125 |
| Example 2-15 | 16.7 | 250 | 1100 | 121 | 1 | 4 | 125 |
| Example 2-16 | 16.7 | 250 | 1100 | 12000 | 1 | 4 | 125 |
| Example 2-17 | 16.7 | 250 | 1100 | 30000 | 1 | 4 | 125 |

The following was found from Table 4.
(1) It was found that the resin composition samples having a polyvinyl alcohol main chain (Examples 2-1 to 2-17) have higher gas barrier properties.
(2) As for flexibility, it was found that the resin composition samples of Examples 2-1 to 2-17 have large elongation at break and elongation at yield and thus excellent flexibility. This is considered to be the action of the grafted functional group and the addition of the low molecular weight compound having hydroxyl groups. Also, it was found that the resin composition sample of Comparative Example 1-1 shows a good result with respect to flexibility.
(3) As for peel adhesiveness, it was found that the resin composition samples of Examples 2-1 to 2-17 have stronger adhesion than the samples of the Comparative Examples. The flexibility of the compositions and hydrophobicity provided by the functional group are considered to contribute to this. In particular, it is considered that hydrophobing the resin compositions causes a hydrophobic interaction with the rubber substrate and contributes to adhering.

Also, it was found that by introducing a coupling agent into a primer, adhesion to ink is enhanced, and an acrylic group is more reactive than a methacrylic group, which is reflected in adhesion.
(4) As for the discoloration preventing effect, it was found that the discoloration of the resin composition samples of Examples 2-1 to 2-17 is more suppressed than the resin composition sample of Comparative Example 1-4.
(5) As for fatigue resistance, it was found that the resin composition samples of Examples 2-1 to 2-17 also have strong fatigue resistance, and the enhancement of flexibility in the modified polyvinyl alcohol resin also leads to the enhancement of fatigue resistance.

INDUSTRIAL APPLICABILITY

According to the disclosure, it is possible to provide a modified polyvinyl alcohol resin composition having high gas barrier properties as well as excellent flexibility, adhesiveness, and fatigue resistance, and, moreover, it is possible to provide a coating and a tire having excellent gas barrier properties, flexibility, adhesiveness, and fatigue resistance by using the modified polyvinyl alcohol resin composition.

The invention claimed is:
1. A modified polyvinyl alcohol resin composition comprising:
a modified polyvinyl alcohol resin obtainable by introducing a linear, alicyclic, branched, or aromatic functional group having 3 to 20 carbon atoms, as a graft chain, into a polyvinyl alcohol as a main chain; and silica; wherein an acrylic group-containing oligosilanol group is further grafted on the modified polyvinyl alcohol resin, and a proportion of the introduced acrylic group-containing oligosilanol group is 0.5 to 10 mol % based on a vinyl alcohol unit as the main chain.
2. The modified polyvinyl alcohol resin composition according to claim 1, further comprising a compound having hydroxyl groups and a molecular weight of 10,000 or less.
3. The modified polyvinyl alcohol resin composition according to claim 2, wherein a content of the compound having hydroxyl groups is more than 0 and 150 parts by mass or less based on 100 parts by mass of the modified polyvinyl alcohol resin.
4. The modified polyvinyl alcohol resin composition according to claim 3, wherein the content of the compound having hydroxyl groups is 5 to 100 parts by mass based on 100 parts by mass of the modified polyvinyl alcohol resin.
5. The modified polyvinyl alcohol resin composition according to claim 1, wherein a content of the silica is 5 to 70 parts by mass based on 100 parts by mass of the modified polyvinyl alcohol resin.
6. The modified polyvinyl alcohol resin composition according to claim 1, wherein a proportion of the functional group introduced by graft modification is 0.5 to 50 mol % based on a vinyl alcohol unit as a main chain.

7. The modified polyvinyl alcohol resin composition according to claim 6, wherein the proportion of the functional group introduced by graft modification is 1 to 30 mol % based on the vinyl alcohol unit as the main chain.

8. The modified polyvinyl alcohol resin composition according to claim 1, wherein a molecular weight of the polyvinyl alcohol as the main chain is 10.000 or more.

9. A coating comprising the modified polyvinyl alcohol resin composition according to claim 1.

10. A tire comprising the coating according to claim 9.

* * * * *